Dec. 27, 1955  J. F. BARNETT  2,728,566
COAL CUTTING BAR HEAD
Filed May 4, 1953  2 Sheets-Sheet 1

INVENTOR
Joseph F. Barnett
BY George E. Cook
ATTORNEY

Dec. 27, 1955   J. F. BARNETT   2,728,566
COAL CUTTING BAR HEAD
Filed May 4, 1953   2 Sheets-Sheet 2
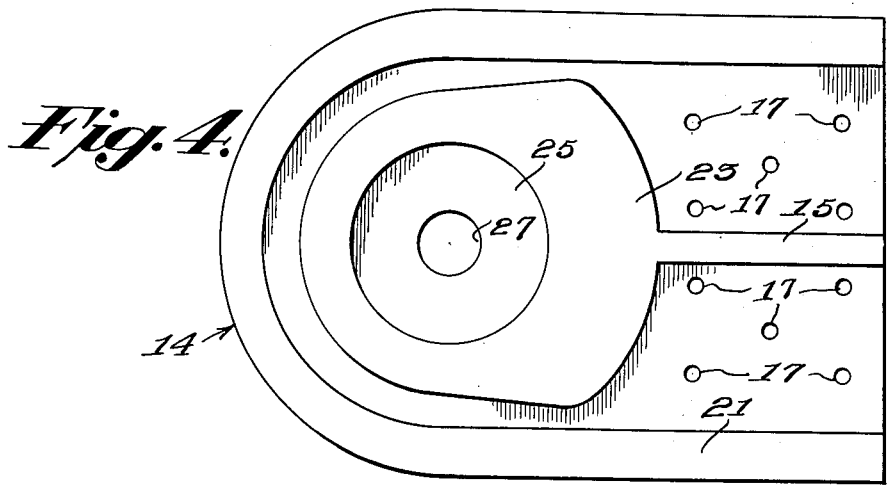
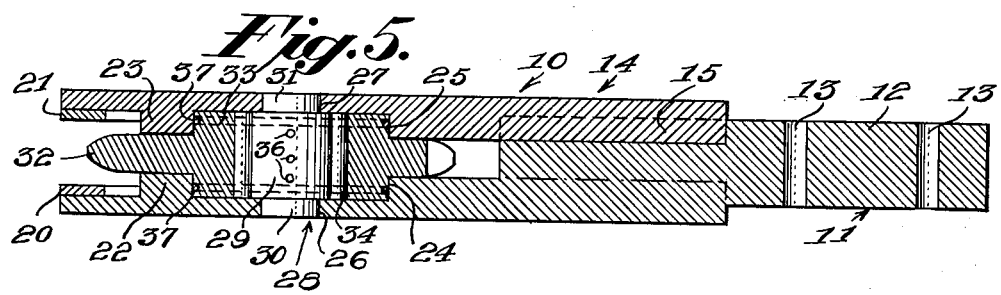
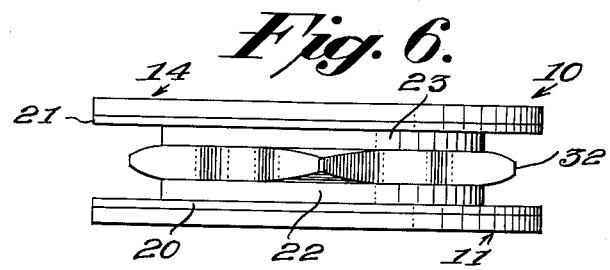
INVENTOR
Joseph F. Barnett.
BY George C. Cook.
ATTORNEY

United States Patent Office 2,728,566
Patented Dec. 27, 1955

2,728,566

COAL CUTTING BAR HEAD

Joseph F. Barnett, Monongahela, Pa.

Application May 4, 1953, Serial No. 352,653

4 Claims. (Cl. 262—28)

This invention relates to a coal cutting bar head.

The invention is more particularly concerned with a novel form of head for connection with the chain supporting bar of coal cutting machines.

Coal cutting machines of the type for operative association therewith of the present invention, as presently constructed, comprise an elongated bar to one end of which is secured a cutting head which is generally of semi-circular form in plan.

The cutting bar together with the head is provided with guide means for a sprocket chain which is movable about the side and end edges of the bar and head and which chain is provided with coal cutting bits. One end of the bar is movably supported by a tractor and from which the chain is driven by a sprocket wheel disposed at said one end of the bar.

In the presently constructed machines, the head includes a central block having a generally semi-circular end and opposed guide plates disposed at opposite sides of the block. With this construction, the bit carrying chain has frictional contact with the surface of the said semi-circular block end and which in operation results in the generation of heat to a degree that the head sometimes becomes red hot, which in some cases causes a stalling of the cutting motor supported by the tractor.

It is accordingly a primary object of this invention to provide a head for coal cutting bars of an improved construction whereby the above noted objections to presently constructed heads are substantially wholly overcome.

A further and more specific object of the present invention is to provide a coal cutting head having a chain engageable sprocket wheel operatively associated therewith and wherein the sprocket wheel has a substantially frictionless and dust and water proof mounting in the head.

Other objects and advantages of the invention will become apparent in the course of the following detailed description, taken in connection with the accompanying drawings, wherein—

Fig. 4 is a plan view of the inner face of the cover plate.

Fig. 5 is a vertical longitudinal sectional view in the plane of line 5—5 on Fig. 1, and Fig. 6 is a front end elevational view of the head.

Figure 1:
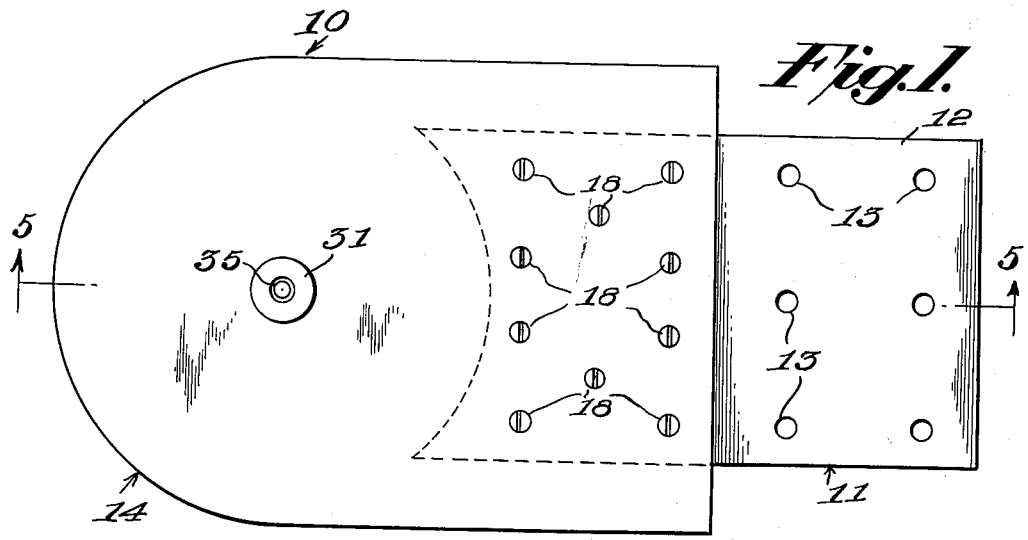
Fig. 1 is a top plan view of the improved coal cutting head in accordance with a preferred structural embodiment thereof.

Referring now in detail to the drawings, the improved head is designated in its entirety as 10.

The head 10 comprises a block 11, one end portion 12 of which is detachably receivable within a channel in one end of a cutting bar and the said one end portion is provided with a plurality of apertures 13 for the reception of suitable securing means by which the head is secured to the bar. The head further comprises a cover plate 14 and while the head may comprise opposed top and bottom cover plates as indicated by broken lines in Fig. 5, the portion of the block 11 corresponding to cover plate 14 may, as shown, be integral with the remaining portion of the block.

The cover plate 14 is preferably provided on its inner face with a locating rib 15 which is receivable within a correspondingly shaped channel 16 in the block 11 and the cover plate 14 is provided with apertures 17 for receiving securing devices 18 which extend into apertures 19 in the block 11 whereby the cover plate 14 is removably secured to the block 11.

The block 11 and the cover plate 14 include marginal portions to which are secured or formed integral therewith chain guide strips 20 and 21 respectively and the block and cover plate are provided with opposed spaced sprocket wheel confining portions 22 and 23 respectively. The portions 22 and 23 are provided with axially aligned sprocket wheel hub receiving circular recesses 24 and 25 respectively and the block and cover plate are provided with apertures 26 and 27 respectively which are axially aligned with the circular recesses 24 and 25.

Figure 2:
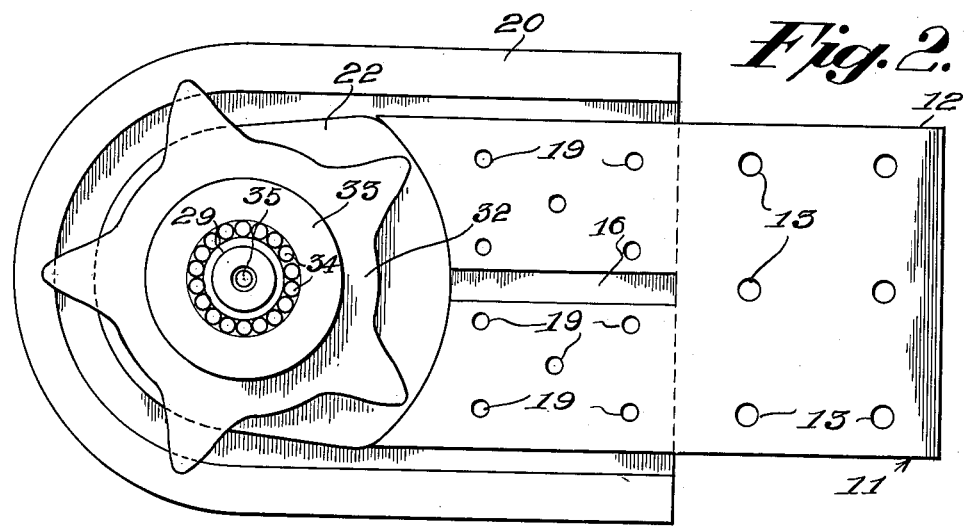
Fig. 2 is a view corresponding to Fig. 1 with the top plate removed.
Figure 3:
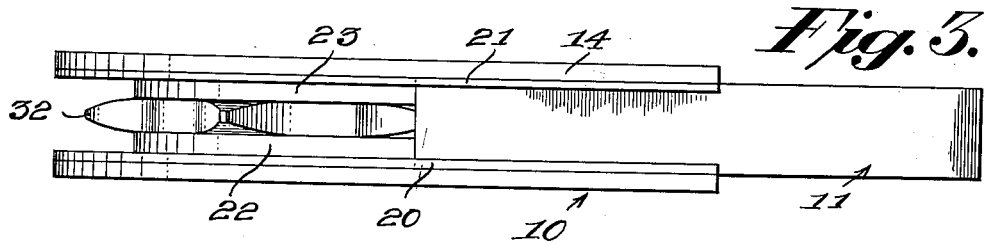
Fig. 3 is an edge elevational view as observed from the bottom of Fig. 1.

As will be observed in Figs. 2 and 4, the guide strips 20, 21 and the adjacent edges of portions 22, 23 provide guide channels for the cutting chain.

A shaft 28 is provided and which includes a central bearing portion 29 and opposite reduced end portions 30 and 31. The shaft end portion 30 has a dust and water tight reception within the aperture 26 and is preferably welded or otherwise rigidly secured therein.

Since the cover plate 14 is removable, the end portion 31 of the shaft cannot have a rigid connection within the aperture 27 but same has dust and water tight engagement with the wall of the aperture.

A chain engageable sprocket wheel 32 is disposed between the portions 22 and 23 and same includes a hub 33 rotatably disposed on the bearing portion 29 preferably by use of a roller bearing structure 34 which may be lubricated by means of a grease fitting 35 in the shaft 28 which is in turn provided with grease conducting ducts 36.

As will be seen in Fig. 5 the sprocket wheel 32 including its hub 33 is closely shrouded by the block 11, cover plate 14 and the portions 22 and 23 and to more positively avoid the admission of dust and water into the bearing 34, the hub 33 is provided with suitable sealing rings 37 which engage the inner walls of the portions 22 and 23.

It should be appreciated from the above disclosure, that the present invention substantially wholly overcomes the above noted objections to coal cutting bar heads by the provision of friction proof supporting means for the coal cutting chain in the head whereby the heretofore objectionable heat caused by friction between the chain and head is avoided.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. A head for a coal cutting bar traversed by a bit carrying chain; comprising a rectangular portion for removable connection with one end of the bar, a pair of plate-like members disposed in spaced parallel relation, and having aligned semi-circular ends and opposite parallel side edges, chain guide strips projecting inwardly from each of said members along said ends and edges, a sprocket wheel confining portion projecting inwardly from each of said members and having an outer curved surface spaced from the inner edge of the respective guide strip and an inner circular wall defining with the member a sprocket hub receiving recess, an aperture extending through each of said members within and concentric with said recess defining circular wall, a shaft having a central bearing portion and reduced end portions extending through said apertures, a sprocket wheel including a hub encircling the bearing portion of said shaft and having its opposite ends seated in said recesses, the toothed portion of said sprocket wheel being laterally confined between said confining portions, and a roller bearing assembly disposed between said shaft bearing portion and the inner wall of said sprocket wheel hub.

2. The structure according to claim 1, together with a sealing ring supported by the outer wall of said hub adjacent each of the opposite ends thereof for water and dust sealing contact with the inner walls of said recesses.

3. The structure according to claim 1, together with bearing lubricating means in said shaft.

4. The structure according to claim 1, wherein said sprocket wheel confining portions have substantially semi-circular edges in spaced relation to the chain guide strips traversing the semi-circular ends of the plate-like members.

References Cited in the file of this patent

UNITED STATES PATENTS

| Number | Name | Date |
|---|---|---|
| 804,562 | Stein | Nov. 14, 1905 |
| 895,449 | Gilmour | Aug. 11, 1908 |
| 1,074,834 | Cartlidge | Oct. 7, 1913 |
| 1,164,424 | Stedelm et al. | Dec. 14, 1915 |
| 1,185,275 | Ball | May 30, 1916 |
| 1,476,726 | Pray | Dec. 11, 1923 |